United States Patent [19]

Janz et al.

[11] 4,156,519

[45] May 29, 1979

[54] VALVE ASSEMBLY

[75] Inventors: Erich E. Janz, Chicago; John S. Cook, Glen Ellyn, both of Ill.

[73] Assignee: Chicago Faucet Company, Des Plaines, Ill.

[21] Appl. No.: 818,069

[22] Filed: Jul. 22, 1977

[51] Int. Cl.² .................. F16K 1/52; F16K 25/00
[52] U.S. Cl. ........................ 251/121; 137/454.6; 251/205
[58] Field of Search ............ 251/205, 215, 318, 121; 137/625.3, 625.31, 454.6; 138/45 A

[56] References Cited

U.S. PATENT DOCUMENTS

| | | | |
|---|---|---|---|
| 691,529 | 1/1902 | Brophy | 137/625.3 |
| 951,267 | 3/1910 | Cater | 251/205 |
| 1,004,578 | 10/1911 | Lavigne | 137/625.3 |
| 1,148,441 | 7/1915 | Brown | 137/454.6 |
| 1,383,005 | 6/1921 | Mertens | 137/454.6 |
| 1,662,659 | 3/1928 | Birnstock | 137/454.6 |
| 1,856,088 | 5/1932 | Brown | 137/454.6 |
| 2,034,573 | 3/1936 | Goehring | 137/625.3 |
| 2,223,567 | 12/1940 | Kersten | 137/454.6 |
| 2,394,345 | 2/1946 | Werner | 137/625.39 |
| 2,642,254 | 6/1953 | Armstrong | 137/625.3 |
| 2,796,679 | 6/1957 | Hugg | 137/454.6 |
| 2,840,102 | 6/1958 | Richter | 137/454.6 |
| 3,040,770 | 6/1962 | Boettcher et al. | 137/454.6 |
| 3,125,122 | 3/1964 | Bermingham | 137/625.3 |
| 3,428,086 | 2/1969 | Glasgow | 137/625.3 |
| 3,523,551 | 8/1970 | Schmitt | 137/454.6 |

Primary Examiner—Martin P. Schwadron
Assistant Examiner—A. Michael Chambers

Attorney, Agent, or Firm—Neuman, Williams, Anderson & Olson

[57] ABSTRACT

A valve assembly is provided for use in controlling the maximum flow of a pressurized fluid through a hollow body. The hollow body includes a fluid inlet and a fluid outlet separated from one another by a partition having an aperture formed therein. The valve assembly includes a sleeve member which is disposed within the hollow body so that one end of the sleeve member is disposed adjacent to and in substantial alignment with the partition aperture. The sleeve member is provided with a discharge port which is spaced from the one end and is in communication with the fluid outlet. Sealingly engaging the portion of the partition defining the aperture is an adjustable seating piece. An elongated valve stem is mounted within the sleeve member for axial movement between open and closed positions. Encompassing the exterior of the sleeve member adjacent the one end is a flow control element which is provided with at least one opening, the latter being adapted to assume selected relative positions with respect to said discharge port so as to vary the effective size of the latter. The control element is adjustable to a selected relative position only when the valve assembly is removed from the hollow body and the valve stem assumes its open position. The control element and the sleeve member one end are provided with complemental means which coact with one another and restrain rotation of the control element relative to the sleeve member one end once the control element is in a selected relative position.

14 Claims, 7 Drawing Figures

VALVE ASSEMBLY

BACKGROUND OF THE INVENTION

In recent years the conservation of water, particularly in certain geographical areas, has become of paramount importance. In an effort to meet this urgent problem, severe restrictions on the use of water during certain periods of time have frequently been imposed. Such corrective measures, however, have oftentimes not been effective because of the lack of cooperation by certain segments of the public, or because health hazards have resulted therefrom.

In a further effort to obtain water conservation, various water-saving devices have heretofore been substituted for or added to existing faucets and valves normally found in buildings, such as homes, hotels, schools, etc. To replace the existing faucets or to modify same to accommodate such a device is in many instances a costly, time-consuming and awkward operation. Furthermore, such devices are oftentimes highly susceptible to malfunction, are bulky and unattractive, and ineffective in attaining the desired results.

SUMMARY OF THE INVENTION

Thus, it is an object of the invention to provide a valve assembly of the type described which is not beset with any of the aforementioned shortcomings.

It is a further object of the invention to provide a valve assembly of the type described which is of simple, inexpensive construction, and may be readily installed in an existing hollow body without requiring the latter to be disassembled and/or disconnected from other plumbing fixtures.

It is a still further object of the invention to provide a valve assembly of the type described wherein varying the maximum fluid flow therethrough may be accomplished without requiring special tools and/or the talents and skills of trained personnel.

It is a still further object of the invention to provide a valve assembly of the type described which requires a mimimum amount of maintenance and repair.

It is also a further object of the invention to provide a valve assembly of the type described which utilizes the fluid pressure in an existing system and permits normal on-off manipulation of the faucet, valve, etc., while at the same time effectively reducing the maximum flow attainable through the faucet or valve.

It is also a further object to provide a valve assembly of the type described which may be readily adjusted to permit the faucet to be returned to normal maximum fluid flow without requiring replacement of any components of the valve assembly.

Further and additional objects will appear from the description, accompanying drawing and appended claims.

In accordance with one embodiment of the invention, a valve assembly of the type described is provided which is removably mounted within a hollow body, the latter having a fluid inlet and a fluid outlet separated by a partition provided with an aperture. The valve assembly includes a sleeve member mounted within the body and to one side of the partition. One end of the sleeve member is disposed adjacent to and in substantial alignment with the partition aperture. At least one discharge port is formed in the sleeve member adjacent the said one end thereof. An adjustable seating piece is disposed adjacent to and in longitudinal relation with the one end of the sleeve member. The seating piece is adapted to sealingly engage the perimeter of the partition aperture. An elongated valve stem is mounted within an axial bore formed in the sleeve member and is adapted to be adjusted axially thereof between open and closed positions. A portion of the stem protrudes beyond the end of the sleeve member through the seating piece and the partition aperture. When the stem assumes an open position, fluid flows from the inlet to the outlet through the seating piece into the sleeve member bore and then out through the discharge port. Encompassing the exterior of the sleeve member adjacent the one end thereof and engaging the seating piece is a control element which is provided with at least one opening. The control element is adapted to assume various selected positions relative to the sleeve member one end whereby the opening of the control element coacts with the discharge port of the sleeve member to vary the effective size of the discharge port and, thus, the amount of maximum flow permissible through the valve assembly. The control element is adjusted to selective relative positions only when the valve assembly is removed from the hollow body and the valve stem assumes its open position. The control element and the sleeve member one end are provided with complemental means which coact to restrain rotational movement of the control element relative to the sleeve member one end when the valve assembly is disposed within the hollow body.

DESCRIPTION

For a more complete understanding of the invention, reference should be made to the drawing wherein.

Figure 1:
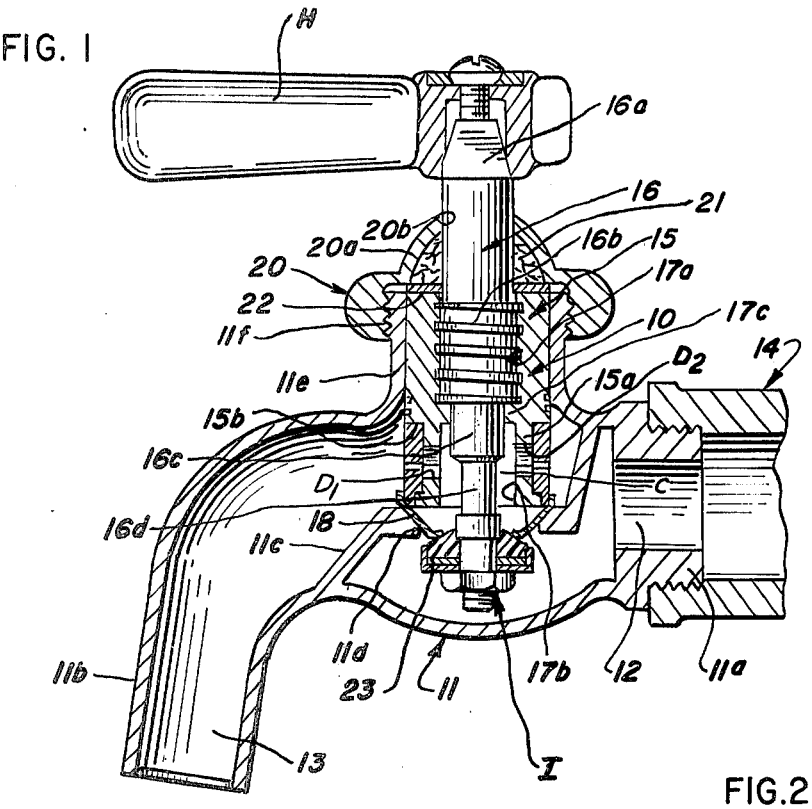
FIG. 1 is an enlarged, fragmentary, vertical sectional view of one form of the improved valve assembly shown mounted within a suitable hollow body or housing and with the valve stem in a closed position.
Figure 2:
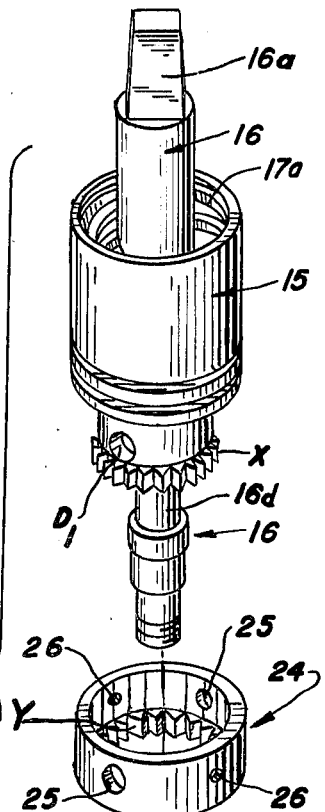
FIG. 2 is a perspective view of the valve assembly of FIG. 1 with components thereof shown in exploded relation.

Referring now to the drawing and more particularly to FIG. 1, one form of the improved valve assembly 10 is shown mounted within a hollow body or housing 11, which may be of the type disclosed in U.S. Pat. No. 1,148,441. the body 11 is provided with a fluid inlet 12, delimited by an externally threaded portion 11a, and a fluid outlet 13 shaped so as to form a downwardly directed spout 11b. Separating the inlet and outlet is an internal partition 11c having a suitable, centrally located aperture 11d formed in a substantially horizontally disposed portion of the partition. The top section of the body includes an upwardly protruding cylindrical neck portion 11e provided with external threads 11f. The longitudinal axis of the cylindrical neck portion 11e is substantially co-axial with the center of the partition aperture 11d.

The external threaded portion 11a is engaged by the threaded end of a conventional pipe or nipple 14 which comprises a component of an existing piping system leading to the source of pressurized water or similar fluid.

Figure 3:
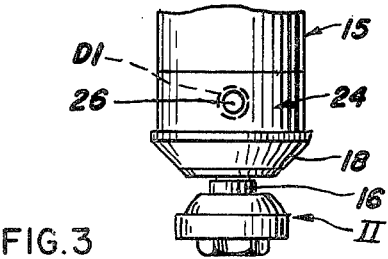
FIG. 3 is a fragmentary elevational view of the valve assembly per se with the valve stem thereof in an open position and the control element in a selected relative position with respect to the discharge port formed in the sleeve member.
Figure 5:
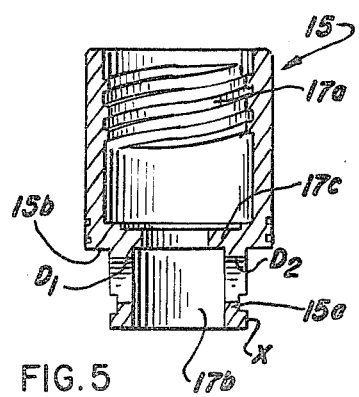
FIG. 5 is an enlarged, vertical, sectional view of the sleeve member per se shown in FIG. 1.

The improved valve assembly 10, in the illustrated embodiment, is similar in some respects to that disclosed in the aforesaid U.S. Pat. No. 1,148,441 and includes a sleeve member 15 having the exterior thereof sized to slidably fit within the neck portion 11e of the body 11; and an elongated valve stem 16 mounted within the sleeve member 15 for axial relative movement between a closed position I, see FIG. 1, and an open position II, see FIG. 3. The lower open end portion 15a of sleeve member 15 has a cylindrical exterior of reduced diameter forming a shoulder 15b. The distal end of portion 15a is encompassed by a narrow band of serrations or teeth X, the function of which will be described more fully hereinafter. Located between shoulder 15b and the band of serrations X is a pair of diametrically opposed discharge ports $D_1$, $D_2$. The ports are in communication with the fluid outlet 13. The bore of the sleeve member 15, in which the stem 16 is mounted, has the upper portion 17a thereof internally threaded. The lower portion 17b of the bore is enlarged and is separated from the upper portion 17a by an annular flange 17c. The stem 16, as seen in FIG. 1, has an upper exposed end 16a on which is mounted a suitable handle H; an externally threaded central portion 16b which is adapted to threadably engage the threads 17a of the sleeve member bore; a cylindrical portion 16c of reduced diameter disposed beneath portion 16b and in slidable engagement with flange 17c; and a lower portion 16d of still further reduced diameter depending from portion 16c. It will be noted that stem portions 16c, 16d cooperate with the lower portion 17b of the sleeve member bore to form a cavity C within the sleeve member through which the fluid flows when the stem is in its open position.

Subtending the lower end 15a of the sleeve member 15 is an adjustable seating piece 18 which has a frustoconical exterior configuration, thereby enabling the piece to be self-aligning within partition aperture 11d, when the valve assembly is mounted within the hollow body 11. The seating piece is held in sealing contact with the periphery of the partition aperture 11d by a cap 20 which threadably engages the external threads 11f formed on the body neck portion 11e, see FIG. 1. The cap, in the illustrated embodiment, has a dome-shaped center portion 20a which is provided with a central opening 20b through which the upper portion 16a of the stem extends.

Located beneath the center portion 20a of the cap 20 is suitable packing material 21 which sealingly encompasses a segment of the stem upper portion. Subtending the packing material and engaging the upper end of sleeve member 15 is a conventional packing ring 22. As the cap 20 is drawn up tight on the neck portion 11e, the cap will bear against the ring 22 and exert a downward force on the sleeve member 15 which, in turn, pushes the seating piece 18 against the periphery of the partition aperture 11d.

Carried on the lower end of the stem 16 is a replaceable closure or valve washer 23 of conventional design. When the stem 16 assumes a closed position I (FIG. 1), the closure 23 will engage the underside of a portion of the seating piece, which extends into aperture 11d, and prevent the fluid flow through the hollow body 11. It will be noted in FIG. 1 that the opening 18a formed in the seating piece 18 is oversized relative to the portion of the stem extending therethrough. Thus, when the stem assumes its open position, the fluid will flow in an upward direction between the perimeter of opening 18a and the portion of the valve stem disposed within the opening. The valve closure 23 is secured to the lower end of the stem by any suitable means.

Encompassing the lower end portion 15a of sleeve member 15 is a flow control element 24 which, in the illustrated embodiment, has a bandlike configuration with annularly spaced pairs of diametrically opposed openings 25, 26 formed therein. Openings 25 have a size and configuration substantially akin to that of discharge ports $D_1$, $D_2$, whereas the openings 26 are substantially smaller than openings 25 (e.g., openings 25 may be 3/16" diameter; openings 26 may be ⅛" diameter). The size differential of openings 25, 26 may be greater or less, if desired.

The lower portion of control element 24 is provided with a narrow band of inwardly-projecting serrations Y which are adapted to mesh with the serrations X formed on the exterior of the sleeve member 15 adjacent the lower end thereof. It is important, as will hereinafter become apparent, that the width (height) of one of the bands of serrations X, Y be less than the distance the stem 16 moves relative to the sleeve member 15 from the closed position I to the open position II so that the bands cannot, under certain circumstances, be in meshing relation.

The control element 24 is adapted to assume selected positions of adjustment relative to the lower end portion 15a of the sleeve member 15 whereby either openings 25 or 26 are aligned with discharge ports $D_1$, $D_2$ or are in partial overlapping relation therewith. The number and relative size of the openings formed in the control element 24 may vary over a wide range and will depend upon the variations in maximum flow desired.

Figures 4, 6, 7:
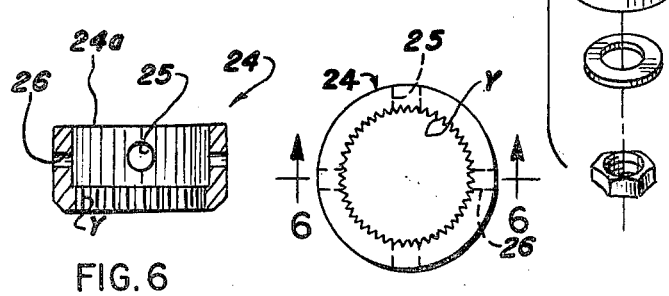
FIG. 4 is similar to FIG. 3 but with the control element in a position whereby it can be rotated with respect to the sleeve member so as to assume a different selected relative position.
FIG. 6 is an enlarged sectional view of the control element per se taken along line 6—6 of FIG. 7.
FIG. 7 is a bottom view of the control element per se.

In order to adjust the control element relative to the sleeve member, it is necessary to first remove the assembly from the hollow body 11, and then adjust the valve stem to its fully opened position II (FIGS. 3–4), whereupon the seating piece 18 and control element 24 will slide downwardly relative to the lower end portion 15a of the sleeve member 15. When the control piece 24 is in the position shown in FIG. 4, the band of serrations X on sleeve member 15 is out of meshing relation with respect to the band of serrations Y on the control element, thereby enabling the latter to be rotated relative to the sleeve member to a selected position whereby either pair of openings 25, 26 is aligned with ports $D_1$, $D_2$ or certain of the openings in the control element are in partial overlapping relation with the ports. Once the control element has been rotated the proper amount, the control element and seating piece are moved axially upwardly as a unit until the upper edge 24a of the control element abuts the shoulder 15b of the sleeve member, whereupon the control element is in the selected relative position. The control element and seating piece will be retained in the raised position by the closure 23 engaging the underside of the seating piece when the valve stem 16 is manually adjusted to the closed position I. Thus, when the valve assembly is mounted within the body 11, the control element will be clamped between the seating piece 18 and shoulder 15b regardless of the relative position of the valve stem.

It is important to note that moving the control piece to selected relative positions does not require the closure to be removed from the end of the valve stem or for the valve stem to be disassembled from the sleeve member. Thus, all that is required to effect adjustment of the control element is to unthread the cap 20 from the neck portion 11e and then withdraw the valve assembly from the hollow body out through the neck portion 11e. Other than the possible use of a conventional adjustable flat faced wrench to loosen and tighten the cap 20, no tools, whatsoever are required in moving the control element to the various selected positions. Furthermore, none of the components comprising the valve assembly 10 need be disassembled to effect adjustment of the control piece. In addition, the adjustment of the control element can be readily accomplished without requiring the hollow body being disconnected from the piping system.

By reason of the control element, the handle H may be manipulated in a normal manner and, yet, the maximum fluid flow through the valve assembly may be carefully regulated even though the handle is moved to its fully opened position.

If restrictions on the use of water are rescinded or modified, or an emergency should exist wherein there should be normal maximum flow through the valve assembly, the control element can be readily adjusted so that the openings 25 are aligned with ports $D_1$, $D_2$. No replacement of any of the components of the valve assembly or hollow body are required to resume normal operation.

Thus, it will be seen that a simple, practical, yet effective way has been provided for practicing water, or fluid, conservation.

We claim:

1. A valve assembly for controlling the maximum flow of a pressurized fluid through a hollow body, the latter having an interior provided with a fluid inlet section and a fluid outlet section separated by a partition having an aperture formed therein, said assembly being removably mountable within the body interior and comprising a sleeve member having a bore and a port formed therein, said port being spaced from one end of said sleeve member, said port extending from the bore to the exterior of said sleeve member and being adapted to be in communication with a body interior section, said sleeve member one end being adapted to be disposed adjacent to and in substantial alignment with the partition aperture; an elongated valve stem mounted within said bore for selective adjustment relative thereto between open and closed positions, said stem, when in open position, being adapted to permit fluid flow from one of the body interior sections into said bore and out through the other of the body interior sections, a portion of said stem protruding longitudinally from the one end of said sleeve member; seating means disposed adjacent said sleeve member one end and encompassing a segment of the protruding stem portion, said seating means being adapted to sealingly engage the perimeter of the partition aperture and coacting with the segment of the protruding valve stem portion to form a fluid passageway when said valve stem is in said open position, said passageway being shut off when the valve stem is in said closed position; and an adjustably mounted flow control element engaging the sleeve member one end and being in contact with said seating means, said element and sleeve member being in encompassing relation, said control element being provided with at least one opening adapted to assume various relative positions with respect to said sleeve member port when said control element is adjusted to selected relative positions with respect to the sleeve member one end, said control element being adjusted to a selected position only when said valve assembly is removed from the hollow body and said valve stem assumes said open position whereby said seating means is movable axially away from the sleeve member one end and said control element is movable axially a predetermined amount relative to said sleeve member one end, said control element and said sleeve member one end being provided with complemental locking means for restraining rotational movement of said control element relative to said sleeve member one end when said valve assembly is disposed within said hollow body.

2. The valve assembly of claim 1 wherein said control element is encompassing the exterior of the sleeve member adjacent the one end thereof and is disposed intermediate the seating means and a shoulder formed on the exterior of the sleeve member.

3. The valve assembly of claim 1 wherein the complemental locking means of the control element and the sleeve member one end includes bands of serrations in intermeshing relation when said control element is in a selected relative position with respect to the sleeve member one end.

4. The valve assembly of claim 3 wherein at least one of the bands is narrow and has a width less than the predetermined axial movement of the control element relative to sleeve member one end when said valve assembly is removed from the hollow body and said valve stem is in said open position.

5. The valve assembly of claim 1 wherein the control element has an annular configuration and is provided with a plurality of annularly spaced openings of varying size, one of said openings having a size at least as great as the size of said port and the remaining openings being of smaller size than said port.

6. The valve assembly of claim 4 wherein the narrow band of serrations is formed on the control element.

7. The valve assembly of claim 6 wherein the narrow band of serrations is disposed adjacent one end face of the control element.

8. The valve assembly of claim 7 wherein the opposite end face of the control element abuts a shoulder formed on the exterior of said sleeve member, when said control element is in a selected relative position.

9. The valve assembly of claim 8 wherein the opening in said control element is disposed intermediate the said opposite end face of the control element and the narrow band of serrations formed on said control element.

10. A valve construction for controlling the maximum flow therethrough of a pressurized fluid when the valve is in a fully open condition, comprising a hollow body having a fluid inlet section and a fluid outlet section separated therefrom by a partition having an aperture formed therein; and a valve assembly removably mounted within the hollow body, said assembly including an elongated sleeve member disposed to one side of said partition and having one open end of the sleeve member positioned adjacent to and in substantial alignment with the partition aperture, said sleeve member being provided with a port adjacent said one end and in communication with one of said sections, a valve stem mounted within a bore formed in said sleeve member for relative longitudinal movement between open and closed positions, an end of said stem protruding from the one end of the sleeve member and into the partition aperture, an ajustable seating piece disposed adjacent the sleeve member one end and encompassing in spaced relation a segment of the protruding end of the valve stem, said seating piece having a surface portion thereof in sealing engagement with the perimeter of the partition aperture whereby fluid flow occurs between the stem segment and the encompassing seating piece and through the port, only when said stem is in an open position, closure means carried by said stem end and movable therewith and stopping fluid flow between the stem segment and encompassing seating piece only when said valve stem is moved to a closed position, and a flow control element in encompassing relation with a portion of the sleeve member adjacent said one end thereof, said control element being provided with at least one opening, said control element and said seating means being captured between said sleeve member one end and said closure means, said control element being adapted to assume various selected relative positions whereby the opening of said control element is disposed in various predetermined registered relations with said port, said control element being movable independently of said sleeve member to said selected relative positions only when said valve assembly is removed from said hollow body and said stem is disposed in said open position, said control element and said sleeve member portion being provided with complemental locking means coacting to restrain relative rotational movement between said control element and sleeve member when said control element is in a selected relative position and said valve assembly is disposed within said hollow body.

11. The valve construction of claim 10 wherein the seating piece, when in sealing engagement with the partition aperture, engages said control element and restrains axial movement thereof relative to said sleeve member.

12. The valve construction of claim 11 wherein the seating piece and the control element are movable axially of said sleeve member only when the valve assembly is removed from the hollow body and said valve stem is not in a closed position.

13. The valve construction of claim 12 wherein the control element is rotational relative to the sleeve member one end only when the valve assembly is removed from the hollow body, the valve stem assumes a fully open position, the closure means carried by the valve stem end has been moved thereby to a non-stopping fluid flow position, and said control element has been moved axially of the sleeve member to the fullest extent.

14. The valve construction of claim 10 wherein the complemental locking means comprises bands of serrations intermeshing with one another when said control element is in a selected relative position with respect to the sleeve member one end.

* * * * *